Sept. 21, 1926.
C. A. NOONE ET AL
1,600,560
CIRCUIT CONTROLLER FOR AUTOMOBILE SIGNALING DEVICES
Filed Nov. 25, 1925 3 Sheets-Sheet 1
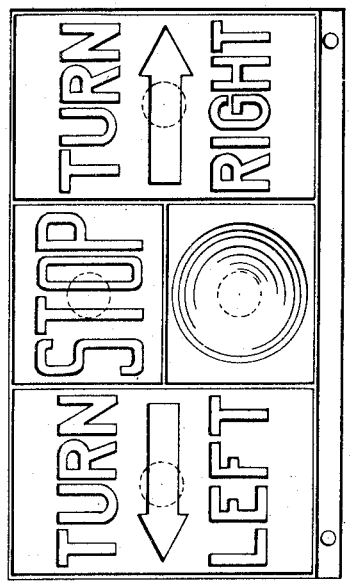
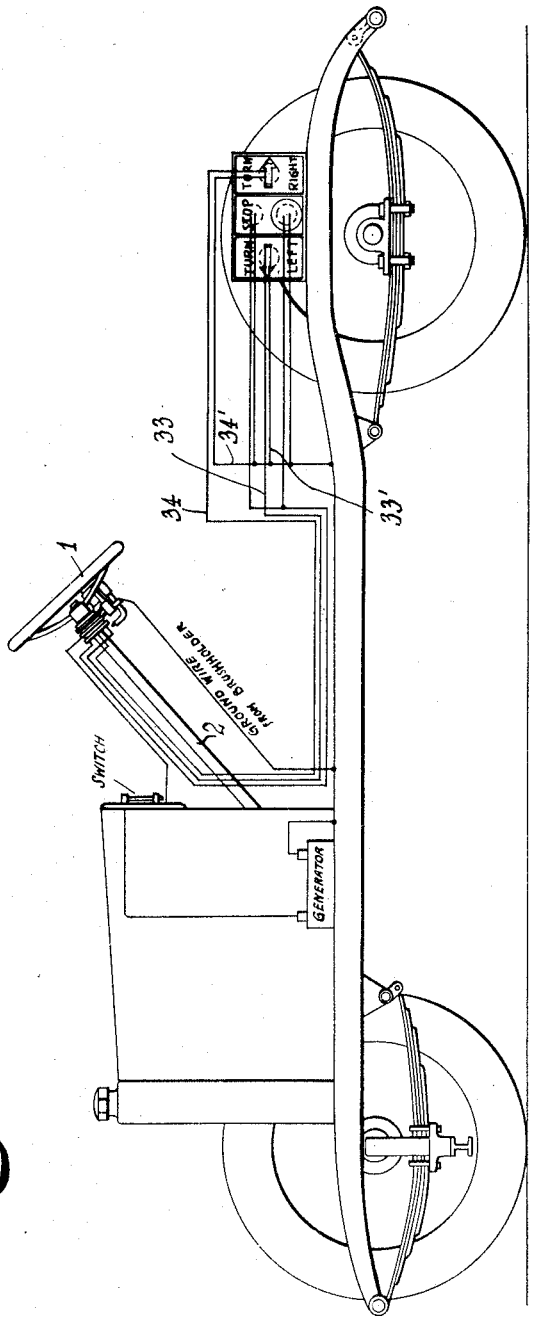
Charles A. Noone
Daniel Freuler INVENTORS.
BY
Emery Booth Janney & Varney ATTORNEYS.

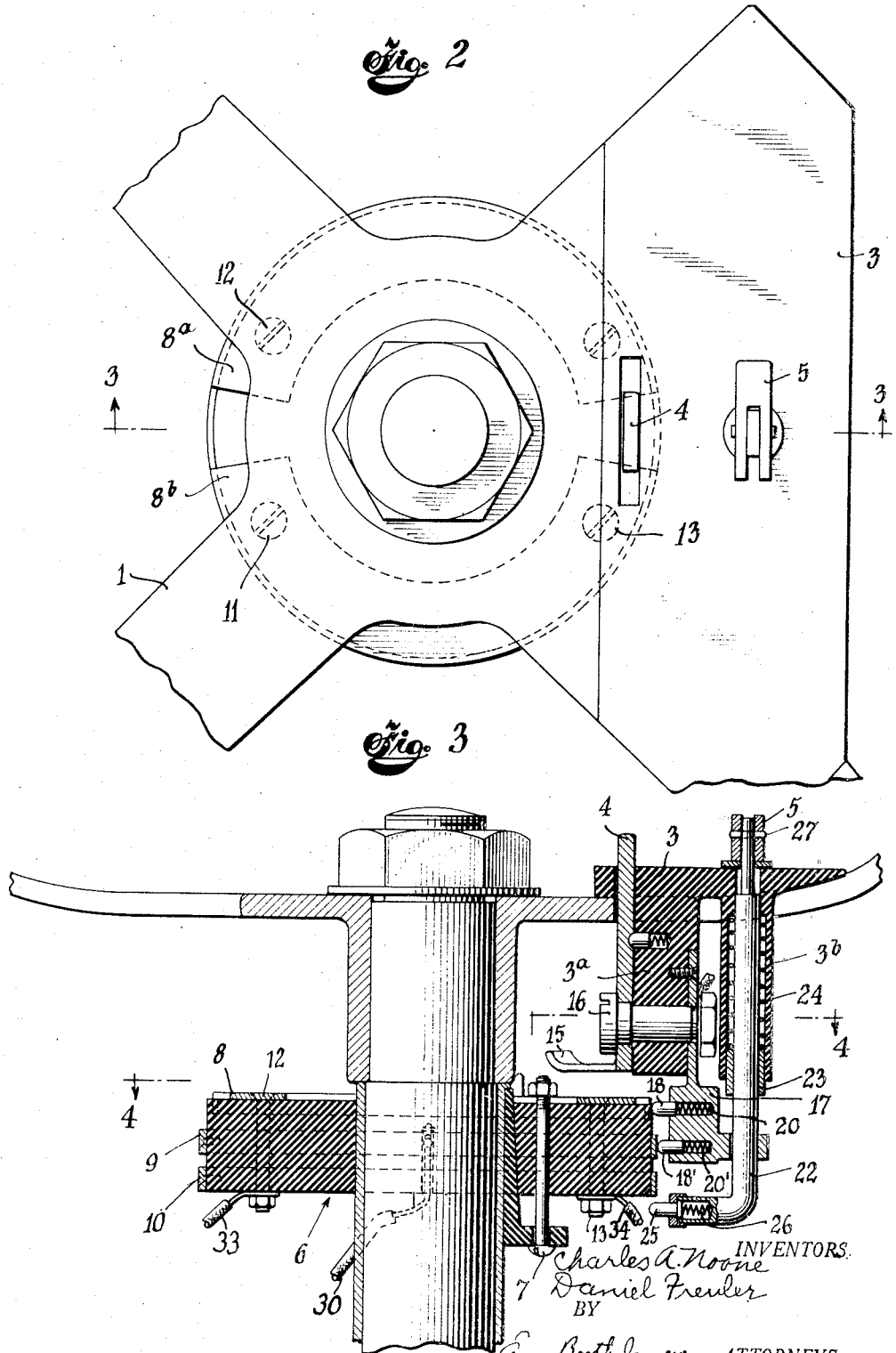

Sept. 21, 1926.
C. A. NOONE ET AL
1,600,560
CIRCUIT CONTROLLER FOR AUTOMOBILE SIGNALING DEVICES
Filed Nov. 25, 1925  3 Sheets-Sheet 3
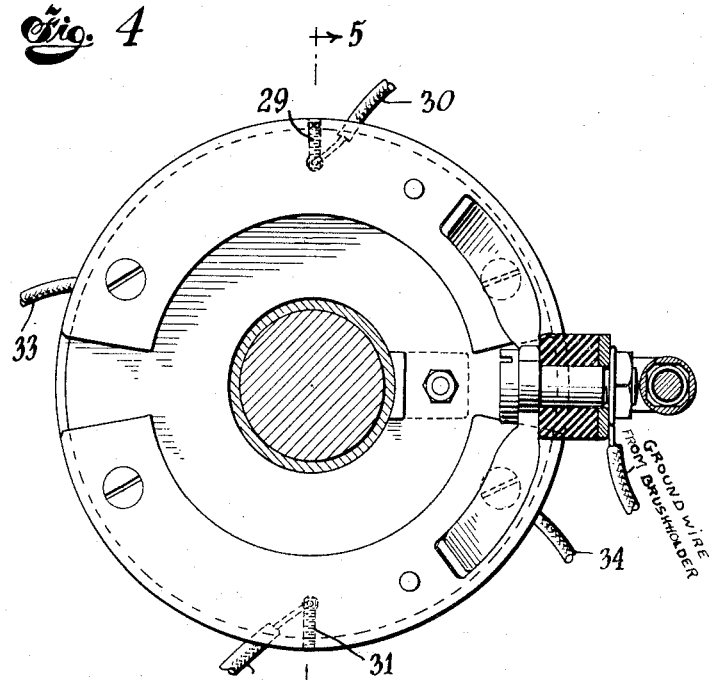
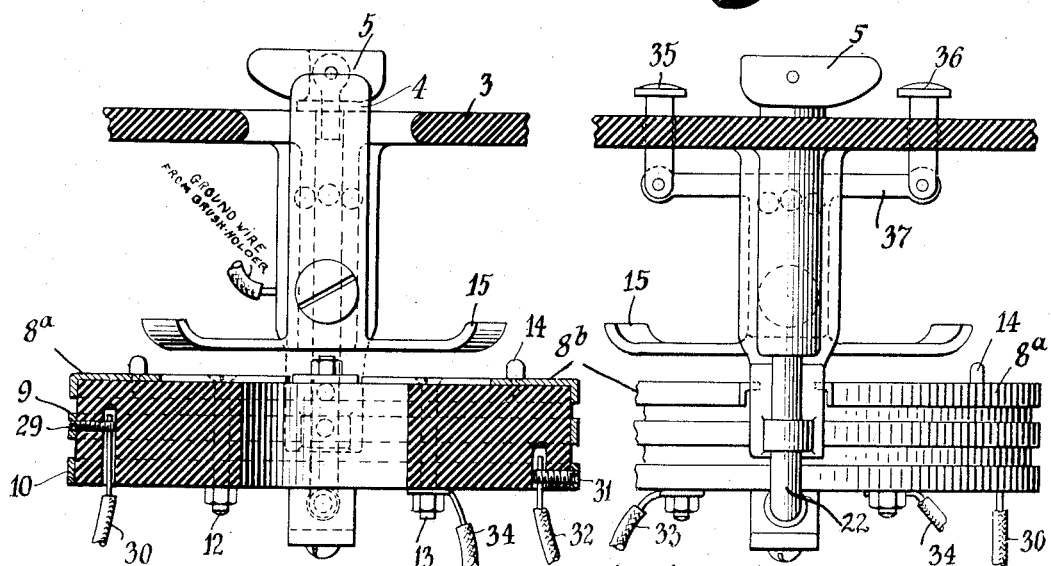

Patented Sept. 21, 1926.

1,600,560

UNITED STATES PATENT OFFICE.

CHARLES A. NOONE AND DANIEL FREULER, OF CHATTANOOGA, TENNESSEE.

CIRCUIT CONTROLLER FOR AUTOMOBILE SIGNALING DEVICES.

Application filed November 25, 1925. Serial No. 71,272.

The invention relates to signaling devices for automobiles and other vehicles, and in particular to that type of device operatable from the driver's seat, by the use of which the driver may indicate to rear traffic his intention to turn a corner, or to stop his car, in advance of actually performing the intended act.

An object of the invention is to provide a device whereby it shall be clearly indicated to rear traffic that the car ahead intends to turn a corner or to stop, as the case may be, far enough in advance of the actual turn so that the driver of the vehicle immediately behind can so govern his vehicle as to avoid confusion to himself and the drivers who may be behind him.

A further object is to provide such a device which shall be manually controllable from the steering wheel, so that a driver may, where traffic is crowded and navigation difficult, indicate his intention without taking his hand from the steering wheel.

A further object is to provide a mechanism so arranged that if the driver forgets to flash the indicator before he makes his intended turn, the indicator will be automatically lighted when and as the steering wheel is turned.

A further object is to so arrange the manually operatable means and the automatic means as to secure a cooperative relation between them, so that the manually operatable means will function until the automatic means, coming into operative position, gradually disengages it, thus securing a continuous signal, not an intermittent one.

Further objects of our invention will be obvious as the description progresses.

In the drawings:

Fig. 1 is a side view of car with my device attached, showing the electrical connections of the various parts of our device with the light.

Fig. 2 is a top view looking down on the steering-wheel.

Fig. 3 is a view on the line 3—3 of Figure 2.

Fig. 4 is a view on the line 4—4 of Figure 3.

Fig. 5 is a view on the line 5—5 of Figure 4 looking in the direction of the arrows.

Fig. 6 is a view looking in the other direction.

Fig. 7 is a view of the signal lamps.

Referring now to the drawings, 1 represents the steering wheel, and 2 the steering post. Clamped to the steering wheel, contiguous to the steering post, is a metal plate 3 with two downwardly projecting extensions $3^a$ and $3^b$. Through the top of this plate project levers 4 and 5, which will be more fully described hereinafter.

Dovetailed around the steering post 2 and clamped securely thereto at 7, is a core 6, of non-conducting material, through which run the contact strips 8, 9 and 10. The strips 9 and 10 may be made in one piece and joined together to make an endless strip. However, for a purpose which we shall presently disclose, we prefer to break the strip 8 at a convenient place, in such a way that the remaining portion will have the flanged ends $8^a$ and $8^b$. These strips may be securely fastened to core by bolts 11, 12, 13 or in any other manner, which will insure that they will remain the same distance from each other throughout the length of the core. The bolt 13 also acts as a binding post to the source of current.

The lever 4 above referred to is suitably pivoted to the extension $3^a$, and comprises an elongated finger which projects up through the top of the plate 4, spreads out into a bottle shape at its middle portion; and is bifurcated at its lower end to form two wings. These are of some suitable conducting material and are adapted when the projecting finger is pushed manually in one direction or the other to make contact with one of the flanged portions $8^a$ or $8^b$, to complete a circuit to the corresponding signal lamp.

The flanged portions $8^a$ and $8^b$ are provided also with non-conducting projections 14, which as the steering wheel is turned and the automatic means brought into operation, underride the wings 15 and gradually disengage them from contact, thus pushing the lever 4 back to its normal position. The projections are so placed that the disengagement will not be completely effected until the automatic means has been brought into operative position, thus ensuring that the signal light will not at any time be extinguished during the operation.

Clamped to the other side of extension $3^a$ by screw 16 is brush holder 17 which carries two brushes 18 and 18'. One of the brushes, which in the particular embodiment of our invention shown in the drawings happens to be the brush 18', is in continuous contact with one of the endless strips, in this embodiment the strip 9. The other is adapted when the steering wheel is in normal straight-ahead position, to maintain its station midway between the flanges 8ª and 8ᵇ of the strip 8, and to be turned with the steering-wheel to contact with the flange corresponding to the direction in which the car is to be turned. The brushes operate on the end of resilient springs 20 20'.

The mechanism used to indicate the driver's intention to stop the car comprises a brush-holder 22 carrying at its lower contact end brush 25 operating on spring 26, adapted to make connection with the stop light through the strip 10. The other end projects above the plate 3 and carries the lever 5 which operates on the pivot 27. The plate 3 at this point is provided with the downwardly extending piece 3ᵇ, and this is provided with an opening (preferably made square) through which the holder 22 passes, and which therefore serves as a guide and support for the holder. The holder may further, if desired, be surrounded with a close-fitting slidable collar of some such construction as is indicated at 23, to prevent it from vibrating with the motion of the vehicle. A resilient spring 24 surrounds the brush holder.

The manner in which we prefer to make our electrical connections will now be described. We may provide in the band 9 an additional binding post which we may make in the form of a screw 29. We bore a hole in this screw large enough to admit the wire 30. Similarly we may provide the screw 31 in the strip 10, through a hole in which the wire 32 will pass. Additional connections 33 and 34 we secure to the end of the binding posts 12 and 13.

In operating our device, to indicate a desire to turn to the right, lever 4 should be turned to the left, thus causing the left hand arm 15 to contact with strip 8ᵇ and complete the circuit through lever 4, screw 16, brush holder 17, brush 18' and band 9, screw 29 and wire 30 to switch, to the generator, to ground, hence by wire 34' to the right turn light; thence by wire 34 to strip 8ᵇ back to lever 4.

In the modification of our invention shown in Figure 6, we may move the lever 4 in either direction by pressing either of the push-buttons 35 or 36, allowing the lever to rock in the proper direction on the arm 37.

The steering wheel when turned carries the brush holder 17 with it, bringing the brush 18 into contact with the strips 8ᵇ. As the wheel is turned, the projection 14 engages the arm 15 and gradually raises it from its position of contact with the flange 8ᵇ, thus gradually breaking the circuit at that point. By the time the arm is entirely raised off the flange 8ᵇ, the brush holder has been brought into contact therewith, so that the signal will not be extinguished at any moment, but will be continuous from the time the lever 4 is pushed to contact position until the steering wheel again occupies straight ahead position after the intended turn has been completed.

When the steering wheel is turned back to normal position, the brush holder assumes such a position that the brush 18 occupies a position midway between the flanged portions 8ª and 8ᵇ, as shown in Fig. 5.

Pushing the lever 4 to the right, or turning the steering wheel to the left makes the circuit through flange 8ª and wire 33 to the left hand light.

To indicate a desire to stop, the lever 5 is raised to a vertical position. This raises brush holder 22, thus bringing brush 25 into contact with strip 10 and making the circuit through brush 25, wire 32 and strip 10.

While the arrangement and construction of parts described herein and shown in the appended drawings is our preferred form, we do not by any means intend to limit ourselves to such form, but any similar arrangement or use of equivalent parts will be considered to come within the scope of our invention.

We claim as our invention:

1. In a device of the class described, in combination with the steering wheel of a mechanically propelled vehicle, a core suitably attached to the steering post, a plurality of contact rings surrounding said core, a connection between said contact rings and a source of current, manually operatable circuit closing means adapted to engage one end of one of the contact rings to close a circuit, automatically operatable means adapted to engage simultaneously one end of one of the contact rings and a portion of one of the other rings to close the same circuit, and means for gradually forcing the manual means back to normal position when the automatic means is in circuit-closing position.

2. In a device of the class described, in combination with the steering wheel of a mechanically propelled vehicle, a core suitably attached to the steering post, a metal plate clamped to the steering wheel, a plurality of contact rings surrounding said core, a manually operatable lever projecting through the top of the metal plate and adapted to engage one of the contact rings to close a circuit, a brush-holder operatable by the steering wheel, said brush holder carrying two brushes, adapted to engage simultaneously two of the contact rings to close the same circuit, additional circuit-closing means, manually operatable, adapted to engage a third contact ring to close a different circuit, and means for holding this last-mentioned circuit-closing means against lateral displacement with the movement of the vehicle.

3. In a device of the class described, in combination with the steering wheel of a mechanically propelled vehicle, a metal plate clamped to said steering wheel, a core suitably attached to the steering post, a plurality of contact rings surrounding said core, a manually operatable lever projecting through the top of the metal plate and pivoted to a downwardly hanging extension thereof, said lever being provided at its lower extremity with winged arms one of which is adapted to engage a projection on one end of one of the contact rings to close a circuit, an automatically operatable brush holder adapted to make simultaneous contact with the end of the contact ring engaged by the aforesaid manually operatable lever, and another contact ring, to close the same circuit, a brush-holder adapted to be brought into or thrown out of contact with a third of said contact rings to complete another circuit, and means for holding the last mentioned brush-holder against lateral displacement with the motion of the car.

4. In a device of the class described, in combination with the steering wheel of a mechanically propelled vehicle, a metal plate clamped to said steering wheel, a core suitably attached to the steering post, a plurality of contact rings surrounding said core, a manually operatable lever projecting through the top of the metal plate and pivoted to a downwardly hanging extension thereof, said lever being provided at its lower extremity with winged arms one of which is adapted to engage a projection on one end of one of the contact rings to close a circuit, an automatically operatable brush holder adapted to make simultaneous contact with the end of the contact ring engaged by the aforesaid manually operatable lever, and another contact ring, to close the same circuit, a brush-holder adapted to be brought into or thrown out of contact with a third of said contact rings to complete another circuit, said last-mentioned brush-holder being held in position by a resilient spring and sliding in a close fitting collar to prevent lateral displacement with the movement of the car.

In testimony whereof we have signed our names to this specification this 19 day of November, 1925.

CHARLES A. NOONE.
DANIEL FREULER.